United States Patent
Kim et al.

(10) Patent No.: US 9,947,103 B1
(45) Date of Patent: Apr. 17, 2018

(54) LEARNING METHOD AND LEARNING DEVICE FOR IMPROVING IMAGE SEGMENTATION AND TESTING METHOD AND TESTING DEVICE USING THE SAME

(71) Applicant: StradVision, Inc., Gyeongsangbuk-do (KR)

(72) Inventors: Yongjoong Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-Do (KR)

( * ) Notice: Subject to any disclaimer, the term of this patent is extended or adjusted under 35 U.S.C. 154(b) by 0 days.

(21) Appl. No.: 15/723,597

(22) Filed: Oct. 3, 2017

(51) Int. Cl.
*G06K 9/00* (2006.01)
*G06T 7/12* (2017.01)
*G06T 7/194* (2017.01)

(52) U.S. Cl.
CPC ................ *G06T 7/12* (2017.01); *G06T 7/194* (2017.01); *G06T 2207/20084* (2013.01); *G06T 2207/20112* (2013.01)

(58) Field of Classification Search
CPC ........... G06T 5/003; G06T 7/12; G06T 7/194; G06T 2207/20084; G06T 2207/20112
See application file for complete search history.

(56) References Cited

U.S. PATENT DOCUMENTS

| 2016/0328630 A1* | 11/2016 | Han | G06K 9/4628 |
| 2017/0200092 A1* | 7/2017 | Kisilev | G06N 99/005 |
| 2017/0213112 A1* | 7/2017 | Sachs | G06K 9/66 |

OTHER PUBLICATIONS

Jonathan Long, et al; "Fully Convolutional Networks for Semantic Segmentation"; CVPR; 2015; 10 pgs.*

(Continued)

*Primary Examiner* — Bhavesh Mehta
*Assistant Examiner* — Ian Lemieux
(74) *Attorney, Agent, or Firm* — Husch Blackwell LLP

(57) ABSTRACT

A method for improving image segmentation using a learning device including steps of: (a) if a training image is obtained, acquiring $(2\text{-}K)_{th}$ to $(2\text{-}1)_{th}$ feature maps through an encoding layer and a decoding layer, and acquiring $1_{st}$ to $H_{th}$ losses from the $1_{st}$ to the $H_{th}$ loss layers respectively corresponding to H feature maps, obtained from the H filters, among the $(2\text{-}K)_{th}$ to the $(2\text{-}1)_{th}$ feature maps; and (b) upon performing a backpropagation process, performing processes of allowing the $(2\text{-}M)_{th}$ filter to apply a convolution operation to $(M-1)_{2\text{-}th}$ adjusted feature map relayed from the $(2\text{-}(M-1))_{th}$ filter to obtain $M_{1\text{-}th}$ temporary feature map; relaying, to the $(2\text{-}(M+1))_{th}$ filter, $M_2$-th adjusted feature map obtained by computing the $M_{th}$ loss with the $M_{1\text{-}th}$ temporary feature map; and adjusting at least part of parameters of the $(1\text{-}1)_{th}$ to the $(1\text{-}K)_{th}$ filters and the $(2\text{-}K)_{th}$ to the $(2\text{-}1)_{th}$ filters.

26 Claims, 10 Drawing Sheets

(56) References Cited

OTHER PUBLICATIONS

Ghiasi, et al. "Laplacian pyramid reconstruction and refinement for semantic segmentation." European Conference on Computer Vision. Springer International Publishing, Jul. 30, 2016.
Zhao, et al. "ICNet for Real-Time Semantic Segmentation on High-Resolution Images." arXiv preprint arXiv:1704.08545 (Apr. 27, 2017).

* cited by examiner

LEARNING METHOD AND LEARNING DEVICE FOR IMPROVING IMAGE SEGMENTATION AND TESTING METHOD AND TESTING DEVICE USING THE SAME

FIELD OF THE INVENTION

The present invention relates to a learning method and a learning device for improving image segmentation and a testing method and a testing device using the same, and more particularly, to the learning method for improving image segmentation by using the learning device, wherein the learning device includes (i) an encoding layer having each of a (1-1)-th to a (1-K)-th filters respectively generating a (1-1)-th to a (1-K)-th feature maps by applying one or more convolution operations to an input image as a training image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, including steps of: (a) the learning device, if the input image is obtained, acquiring the (2-K)-th to the (2-1)-th feature maps through the encoding layer and the decoding layer, and acquiring a 1-st to an H-th losses from the 1-st to the H-th loss layers respectively corresponding to each of H feature maps, obtained from the H filters, among the (2-K)-th to the (2-1)-th feature maps; and (b) the learning device, upon performing a backpropagation process, performing processes of (1) allowing the (2-M)-th filter to apply a convolution operation to an (M−1)$_2$-th adjusted feature map relayed from the (2-(M−1))-th filter to thereby obtain an $M_1$-th temporary feature map; and (2) relaying, to the (2-(M+1))-th filter, $M_2$-th adjusted feature map obtained by computing the M-th loss with the $M_1$-th temporary feature map and (3) adjusting at least part of parameters of the (1-1)-th to the (1-K)-th filters and the (2-K)-th to the (2-1)-th filters, where M is an integer greater than or equal to 2 and less than or equal to K−1, wherein, as an initial state of the step (b), the 1-st loss layer computes the 1-st loss corresponding to the (2-1)-th feature map, and the (2-1)-th filter applies a convolution operation to the 1-st loss to thereby acquire an $l_2$-th adjusted feature map, and the (2-1)-th filter relays the $l_2$-th adjusted feature map to the (2-2)-th filter; and the learning device, the testing method and the testing device using the same.

BACKGROUND OF THE INVENTION

Deep Convolution Neural Networks, or Deep CNN, is the core of the remarkable development in the field of Deep Learning. Though CNN was already employed to solve character recognition problems in 1990s, it is not until recently that CNN has become widespread in Machine Learning. Due to the recent researches, Convolution Neural Networks (CNN) have been a very useful and powerful tool in the field of Machine Learning. For example, in 2012, Deep CNN significantly outperformed its competitors in an annual software contest, the ImageNet Large Scale Visual Recognition Challenge, and won the contest.

As a result, a new trend to adapt Deep Learning technologies for image segmentation has been emerged. For a reference, image segmentation may include processes of partitioning an input image, e.g., a training image or a test image, into multiple semantic segments and determining a set of the semantic segments with clear boundaries such that the semantic segments collectively covering the entire input image. A result of the image segmentation is so-called a label image.

FIG. 1 is a drawing schematically illustrating a process of learning for image segmentation using CNN according to a prior art. Referring to FIG. 1, feature maps corresponding to an input image, i.e. a training image, are acquired by applying convolution operations multiple times to the input image through a plurality of convolutional filters. Then, a label image corresponding to the input image is obtained by applying deconvolution operations multiple times to an ultimate output from the convolutional layers, through a plurality of deconvolutional filters.

In detail, a configuration of CNN that encodes the input image by the convolution operations and decodes the feature map by the deconvolution operations to obtain the label image is named as an encoding-decoding network, i.e. U-Net. During an encoding process, a size of an output of each convolutional filter is reduced to a half of the size of an input thereof whereas number of channels of the output is increased as twice as that of the input thereof whenever a convolution operation is applied. This is to reduce an amount of computations by scaling down the size of the input image or that of its corresponding feature maps, and thus extracting complex patterns through the increased number of channels while taking an advantage of the reduced amount of computations. In general, passing through respective convolution filters causes the size of the input image or that of its corresponding feature maps to be scaled down by a ratio of 1/2 and the number of channels thereof to be doubled.

Moreover, the downsized feature maps remove much of its high-frequency regions and retain information with respect to its low-frequency regions which represent semantic and detailed parts of the input image, e.g. sky, roads, architectures, and cars etc. Such meaningful parts of the input image are used to infer the label image by performing the deconvolution operations during the decoding process.

Further, for a learning process of CNN adopting Deep Learning, a loss that is a difference between Ground Truth (GT) label image and the label image predicted from the training image is computed. And during a backpropagation process, the computed loss is relayed in a reverse direction, which is a direction opposite to that of generating the label image. However, there is a problem in that values of the loss becomes smaller and smaller as it is propagated back in the reverse direction and becomes too small to adjust parameters of each filter on the U-Net.

Thus, the inventor of the present invention proposes a novel approach, which can solve the above-mentioned problem.

SUMMARY OF THE INVENTION

It is an object of the present invention to provide a method for preventing a loss from diminishing during a backpropagation process during a learning process of CNN capable of performing image segmentation.

It is another object of the present invention to provide a method for finding optimal parameters of each filter by computing each corresponding loss for each filter in a decoding layer during the backpropagation process.

It is still another object of the present invention to provide a method for accurately performing image segmentation by using the optimal parameters of each filter.

In accordance with one aspect of the present invention, there is provided a learning method for improving image segmentation by using a learning device, wherein the learning device includes (i) an encoding layer having each of a (1-1)-th to a (1-K)-th filters respectively generating a (1-1)-th to a (1-K)-th feature maps by applying one or more convolution operations to a training image as an input image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, including steps of: (a) the learning device, if the input image is obtained, acquiring the (2-K)-th to the (2-1)-th feature maps through the encoding layer and the decoding layer, and acquiring a 1-st to an H-th losses from the 1-st to the H-th loss layers respectively corresponding to each of H feature maps, obtained from the H filters, among the (2-K)-th to the (2-1)-th feature maps; and (b) the learning device, upon performing a backpropagation process, performing processes of (1) allowing the (2-M)-th filter to apply a convolution operation to an (M−1)2-th adjusted feature map relayed from the (2-(M−1))-th filter to thereby obtain an M1-th temporary feature map; and (2) relaying, to the (2-(M+1))-th filter, M2-th adjusted feature map obtained by computing the M-th loss with the M1-th temporary feature map and (3) adjusting at least part of parameters of the (1-1)-th to the (1-K)-th filters and the (2-K)-th to the (2-1)-th filters, where M is an integer greater than or equal to 2 and less than or equal to K−1, wherein, as an initial state of the step (b), the 1-st loss layer computes the 1-st loss corresponding to the (2-1)-th feature map, and the (2-1)-th filter applies a convolution operation to the 1-st loss to thereby acquire an l2-th adjusted feature map, and the (2-1)-th filter relays the l2-th adjusted feature map to the (2-2)-th filter.

In accordance with another aspect of the present invention, there is provided a testing method for performing image segmentation on a test image as an input image, including steps of: (a) a testing device acquiring the test image, on conditions that (I) a learning device includes (i) an encoding layer having each of a (1-1)-th to a (1-K)-th filters respectively generating a (1-1)-th to a (1-K)-th feature maps by applying one or more convolution operations to a training image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, (II) the learning device, if a training image is obtained, acquires the (2-K)-th to the (2-1)-th feature maps through the encoding layer and the decoding layer, and acquires a 1-st to an H-th losses from the 1-st to the H-th loss layers respectively corresponding to each of H feature maps, obtained from the H filters, among the (2-K)-th to the (2-1)-th feature maps; (III) the learning device, upon performing a backpropagation process, performs processes of (1) allowing the (2-M)-th filter to apply a convolution operation to an (M−1)2-th adjusted feature map relayed from the (2-(M−1))-th filter to thereby obtain an M1-th temporary feature map; and (2) relaying, to the (2-(M+1))-th filter, M2-th adjusted feature map obtained by computing the M-th loss with the M1-th th temporary feature map; and (3) adjusting at least part of parameters of the (1-1)-th to the (1-K)-th filters and the (2-K)-th to the (2-1)-th filters, where M is an integer greater than or equal to 2 and less than or equal to K−1, wherein, as an initial state of (III), the 1-st loss layer computes the 1-st loss corresponding to the (2-1)-th feature map, and the (2-1)-th filter applies a convolution operation to the 1-st loss to thereby acquire an l2-th adjusted feature map, and the (2-1)-th filter relays the l2-th adjusted feature map to the (2-2)-th filter; and (IV) the learning device acquires adjusted parameters of the (2-K)-th to the (2-1)-th filters and the (1-1)-th to the (1-K)-th filters; and (b) the testing device performing image segmentation on the acquired test image by utilizing the adjusted parameters of the (2-k)-th to the (2-1)-th filters and the (1-1)-th to the (1-K)-th filters.

In accordance with still another aspect of the present invention, there is provided a learning device for improving image segmentation, wherein the learning device includes (i) an encoding layer having each of a (1-1)-th to a (1-K)-th filters respectively generating a (1-1)-th to a (1-K)-th feature maps by applying one or more convolution operations to a training image as an input image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, including: a communication part for receiving the input image; a processor for performing processes of (I) acquiring, if the input image is obtained, the (2-K)-th to the (2-1)-th feature maps through the encoding layer and the decoding layer, and acquiring a 1-st to a H-th losses from the 1-st to the H-th loss layers respectively corresponding to each of H feature maps, obtained from the H filters, among the (2-K)-th to the (2-1)-th feature maps; and of (II) upon performing a backpropagation process, (i) allowing the (2-M)-th filter to apply a convolution operation to an (M−1) 2-th adjusted feature map relayed from the (2-(M−1))-th filter to thereby obtain an M1-th temporary feature map; (ii) relaying, to the (2-(M+1))-th filter, M2-th adjusted feature map obtained by computing the M-th loss with the M1-th temporary feature map; and (iii) adjusting at least part of parameters of the (1-1)-th to the (1-K)-th filters and the (2-K)-th to the (2-1)-th filters, wherein M is an integer greater than or equal to 2 and less than or equal to K−1 and wherein, as an initial state, the 1-st loss layer computes the 1-st loss corresponding to the (2-1)-th feature map, and the (2-1)-th filter applies a convolution operation to the 1-st loss to thereby acquire an l2 adjusted feature map, and the (2-1)-th filter relays the l2 adjusted feature map to the (2-2)-th filter.

In accordance with still yet another aspect of the present invention, there is provided a testing device for performing image segmentation on a test image as an input image, including: a communication part for acquiring the test image, on conditions that (I) a learning device includes (i) an encoding layer having each of a (1-1)-th to a (1-K)-th filters respectively generating a (1-1)-th to a (1-K)-th feature maps by applying one or more convolution operations to a training image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, (II) the learning device, if a training image is obtained, acquires the (2-K)-th to the (2-1)-th feature maps through the encoding layer and the decoding layer, and acquires a 1-st to an H-th losses from the 1-st to the H-th loss layers respectively corresponding to each of H feature maps, obtained from the H filters, among the (2-K)-th to the (2-1)-th feature maps; (III) the learning device, upon performing a backpropagation process, performs processes of (1) allowing the (2-M)-th filter to apply a convolution operation to an (M−1)2-th adjusted feature map relayed from the (2-(M−1))-th filter to thereby obtain an M1-th th temporary feature map; and (2) relaying, to the (2-(M+1))-th filter, M2-th adjusted feature map obtained by computing the M-th loss with the M1-th th temporary feature map; and (3) adjusting at least part of parameters of the (1-1)-th to the (1-K)-th filters and the (2-K)-th to the (2-1)-th filters, where M is an integer greater than or equal to 2 and less than or equal to K−1, wherein, as an initial state of (III), the 1-st loss layer computes the 1-st loss corresponding to the (2-1)-th feature map, and the (2-1)-th filter applies a convolution operation to the 1-st loss to thereby acquire an l2-th adjusted feature map, and the (2-1)-th filter relays the l2-th adjusted feature map to the (2-2)-th filter; and (IV) the learning device acquires adjusted parameters of the (2-K)-th to the (2-1)-th filters and the (1-1)-th to the (1-K)-th filters; and a processor for performing image segmentation or supporting another device to perform image segmentation on the acquired test image by utilizing the adjusted parameters of the (2-k)-th to the (2-1)-th filters and the (1-1)-th to the (1-K)-th filters.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
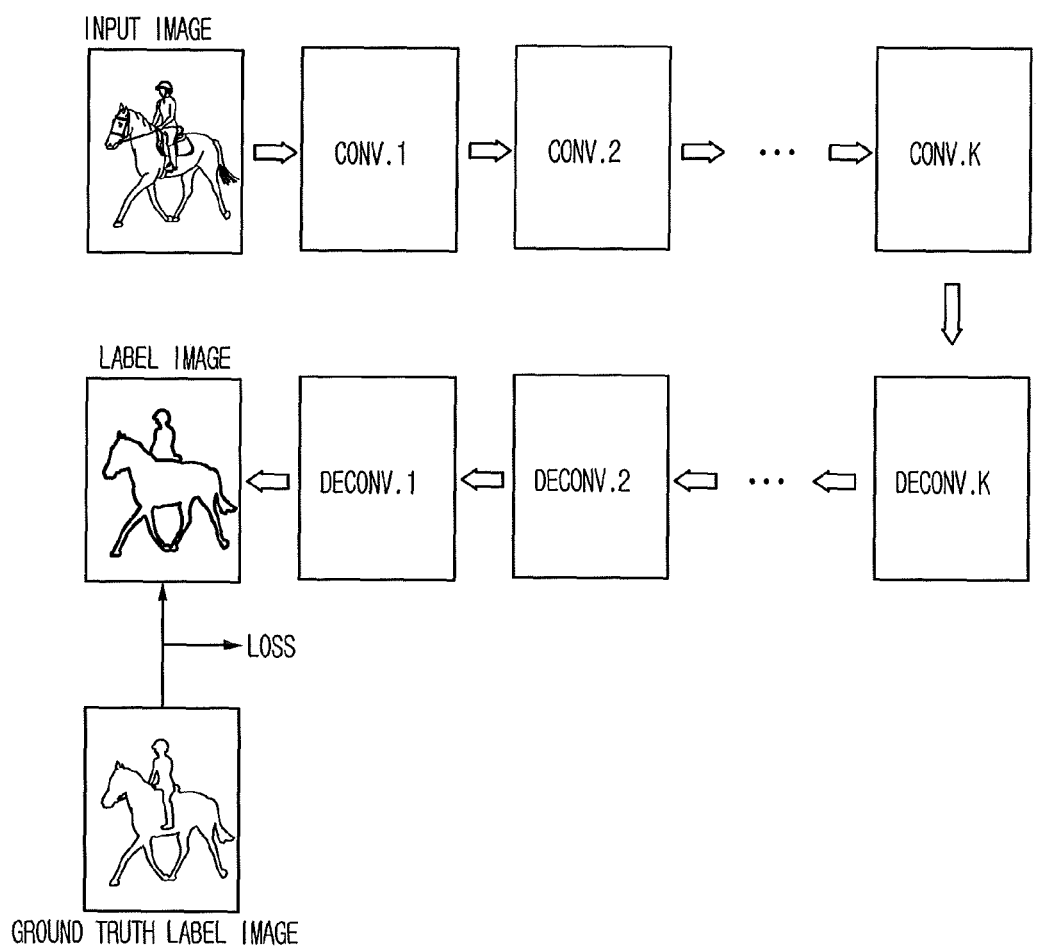
FIG. 1 is a drawing schematically illustrating a learning process of CNN capable of performing image segmentation according to a prior art.

To make purposes, technical solutions, and advantages of the present invention clear, reference is made to the accompanying drawings that show, by way of illustration, more detailed example embodiments in which the invention may be practiced. These embodiments are described in sufficient detail to enable those skilled in the art to practice the invention.

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like reference numerals refer to like or similar features throughout the several views.

Hereinafter, preferred embodiments of the present invention will be described in detail with reference to the accompanying drawings so as to those skilled in the art can easily carry out the present invention.

Figure 2A:
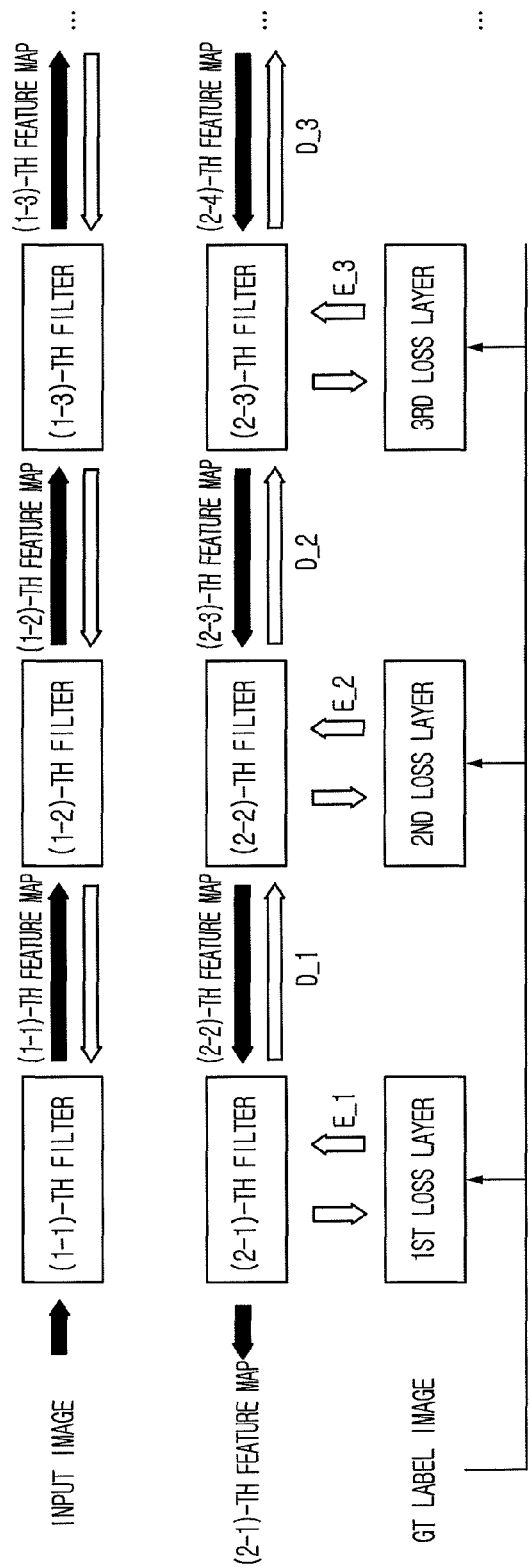
FIGS. 2A and 2B are drawings illustrating a learning process of a learning device including CNN capable of performing image segmentation by using multiple loss layers in accordance with one example embodiment of the present invention.
Figure 2B:
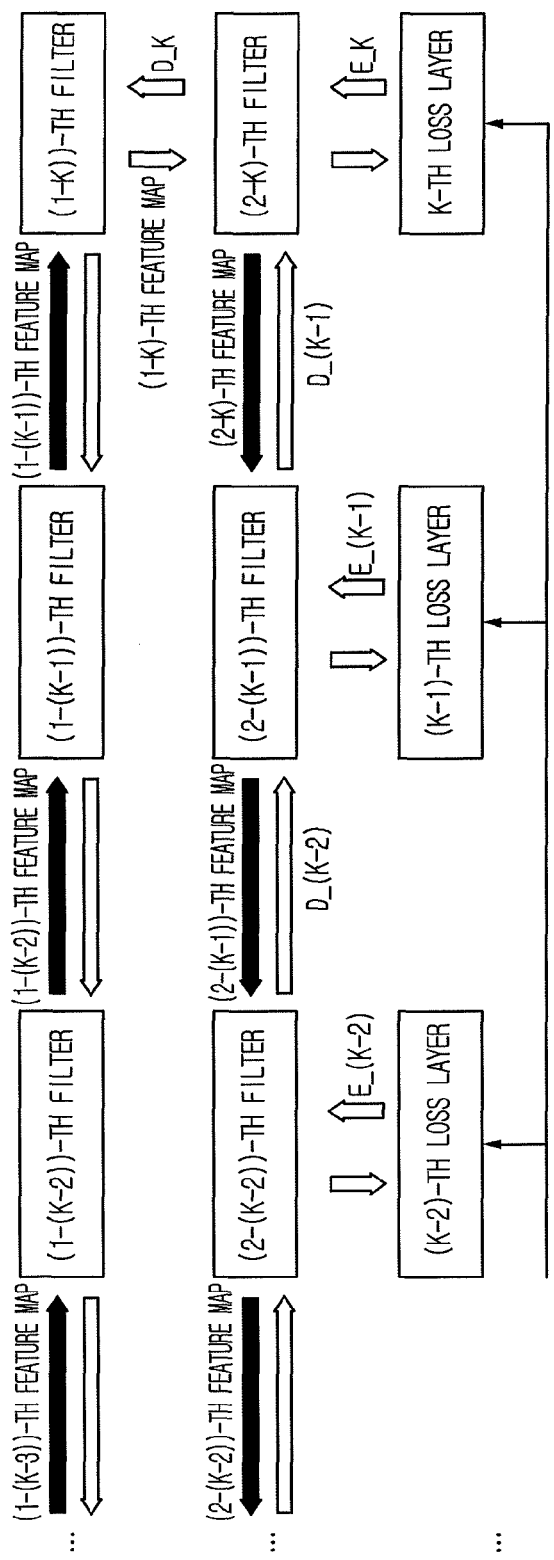

FIGS. 2A and 2B are drawings illustrating a learning process of a learning device including CNN capable of performing image segmentation by using multiple loss layers in accordance with one example embodiment of the present invention.

The learning device (not shown) adopting the CNN with multiple loss layers may include a communication part (not shown) and a processor (not shown). Specifically, the communication part may receive a training image as an input image, and the processor may be configured to perform processes of applying at least one convolution operation to the training image to acquire feature map and then applying at least one deconvolution operation to the feature map to acquire a label image. Further, the processor may perform a process of optimizing parameters of each filter on a U-Net by relaying multiple losses back to each filter during a backpropagation process.

Moreover, the learning device may include an encoding layer having K filters, i.e., a (1-1)-th to a (1-K)-th filters, a decoding layer having K filters, i.e., a (2-1)-th to a (2-K)-th filters, each of which corresponds to each of the (1-1)-th to the (1-K)-th filters, and a 1-st to a K-th loss layers respectively interacting with the (2-1)-th to the (2-K)-th filters.

Referring to FIGS. 2A and 2B, the learning process may be initiated by receiving the training image as the input image. And then, the input image is supplied to the (1-1)-th filter in the encoding layer. The (1-1)-th to the (1-K)-th filters in the encoding layer perform convolution operations to obtain feature maps, i.e., encoded feature maps, derived from the input image.

Specifically, as shown in FIGS. 2A and 2B, the (1-1)-th filter receives the input image, performs the convolution operation to generate a (1-1)-th feature map, and relays the (1-1)-th feature map to the (1-2)-th filter. Then, the (1-2)-th filter receives the (1-1)-th feature map, performs the convolution operation to generate a (1-2)-th feature map, and relays the (1-2)-th feature map to the (1-3)-th filter. It can be inferred from the above description that such a procedure continues with the rest of the respective filters in the encoding layer and eventually advances to the (1-K)-th filter to generate a (1-K)-th feature map.

Herein, a size of an output of each of the (1-1)-th to the (1-K)-th filters is reduced to, e.g., a half of that of an input thereof. Thus, an amount of computations is reduced. Moreover, number of channels of the output is increased as twice as that of the input thereof whenever the convolution operation is applied.

For example, if the size of the (1-1)-th feature map is 320×240 and the number of channels thereof is 8, (i) the size of the (1-2)-th feature map is 160×120 and the number of channels thereof is 16 and (ii) the size of the (1-3)-th feature map is 80×60 and the number of channels thereof is 32 and so on.

Thereafter, by referring to FIGS. 2A and 2B again, the 1-K feature map is supplied to the decoding layer to produce the label image. The (2-K)-th to the (2-1)-th filters in the decoding layer perform deconvolution operations to obtain the label image.

After receiving the (1-K)-th feature map from the (1-K)-th filter, the decoding layer including the decoding filters, i.e., the (2-K)-th to the (2-1)-th filters, applies deconvolution operations to the (1-K)-th feature map, to thereby acquire the label image. By performing the deconvolution operations, the sizes of the respective feature maps, i.e., decoded feature maps, derived from the (1-K)-th feature map are increased while the number of channels thereof is reduced, sequentially. The filters in the decoding layer may retain information on edges of the encoded feature maps and may reduce information on other parts except the information on edges thereof, and thus producing the label image.

As shown in FIGS. 2A and 2B, the (2-K)-th filter receives the (1-K)-th feature map and performs the deconvolution operation to generate a (2-K)-th feature map, and relays the (2-K)-th feature map to the (2-(K−1))-th filter. The (2-(K−1))-th filter follows same procedure described above to generate a (2-(K−1))-th feature map and relays the (2-(K−1))-th feature map to the (2-(K−2))-th filter. It can be inferred from the above description that the procedure continues with the rest of the respective filters in the decoding layer and finally advances to the (2-1)-th filter to generate a (2-1)-th feature map.

Herein, a size of an output of each of the (2-1)-th to the (2-K)-th filters is as twice as that of an input thereof whereas the number of channels of the output of each of the (2-1)-th to the (2-K)-th filters is reduced to a half of that of the input thereof.

For example, if the size of the (2-K)-th feature map is 20×15 and the number of channels thereof is 128, the size of the (2-(K−1))-th feature map is 40×30 and the number of channels thereof is 64. Likewise, the size of the (2-(K−2))-th feature map is 80×60 and the number of channels thereof is 32.

Consequently, the size and the number of channels of the (1-(K−1))-th feature map and those of the (2-K)-th feature map are identical to each other, and those of the (1-1)-th feature map are equal to those of the (2-2)-th feature map. It can be inferred from the above description that the size of the input image, i.e., the training image, and that of the (2-1)-th feature map, i.e., the label image, are same with each other.

Referring to FIGS. 2A and 2B again, the (2-1)-th to the (2-K)-th filters in the decoding layer respectively interact with the 1-st to the K-th loss layers. The 1-st to the K-th loss layers respectively compute the 1-st to the K-th losses and the loss layers provide the respective losses to the corresponding filters, i.e., the (2-1)-th to the (2-K)-th filters. The 1-st to the K-th losses are computed by comparing a Ground Truth (GT) label image with each of the decoded feature maps generated by the (2-1)-th to the (2-K)-th filters.

Herein, there may be a (3-1)-th to a (3-K)-th filters (not shown) between the 1-st to the K-th loss layers and the (2-1)-th to the (2-K)-th filters, where the (3-1)-th to the (3-K)-th filters are convolution filters with a filter size of 1×1 capable of adjusting the number of channels of each of the decoded feature maps.

During the backpropagation process, each of the (2-1)-th to the (2-K)-th filters utilize its corresponding loss computed by each corresponding loss layer to thereby produce each corresponding temporary feature map, and then produce each corresponding adjusted feature map. Certainly, a plurality of the temporary feature maps and the adjusted feature maps may be generated during the backpropagation process by reversely traversing the U-Net. Details of this process will be disclosed later.

The learning device adjusts the parameters of at least one of the filters on the U-Net, i.e., the (1-1)-th to the (1-K)-th filters and the (2-K)-th to the (2-1)-th filters, through the backpropagation process to minimize the value of the 1-st loss. That is, optimal values for the parameters may be found and calculated through such a backpropagation process.

In FIGS. 2A and 2B, the (1-K)-th feature map generated by the (1-K)-th filter is the most influential feature map because it contains semantic information indicating meaningful segment units within the input image. Also, the (1-K)-th feature map is the smallest feature map among all the feature maps. Accordingly, the (1-K)-th feature map has significant influence on estimating the label image to be acquired through the decoding layer. If the semantic information contained in the (1-k)-th feature map is incorrect and the meaningful segment units are misrepresented, the estimated label image may be erroneous.

According to one of the conventional technology, a loss layer may be connected to the last filter on the U-Net, i.e., the (2-1)-th filter, and a loss calculated may be reversely relayed to each of the filters on the U-Net during the backpropagation process. Such a conventional technology adopts a single final loss. As the calculated loss is propagated back from the (2-1)-th filter to the (2-K)-th filter, values of the loss becomes smaller and smaller and eventually becomes too small to be used for adjusting the parameters.

Hence, according to one specific embodiment of the present invention, each of the filters of the decoding layer is respectively connected to and interacted with each of the loss layers. The individual losses for the respective feature maps are computed to generate the temporary and the adjusted feature maps to be used to adjust the parameters.

Besides, in FIGS. 2A and 2B, each of the loss layers computes the values of the respective losses. The respective filters in the decoding layer apply the convolution operations to the respective adjusted feature maps obtained from their corresponding previous filters as inputs thereof, and thus generating the respective temporary feature maps. Then, the respective filters in the decoding layer newly produce respective adjusted feature maps as outputs thereof by using the respective losses and the respective temporary feature maps, and respectively relays them to their corresponding next filters.

Figure 3:
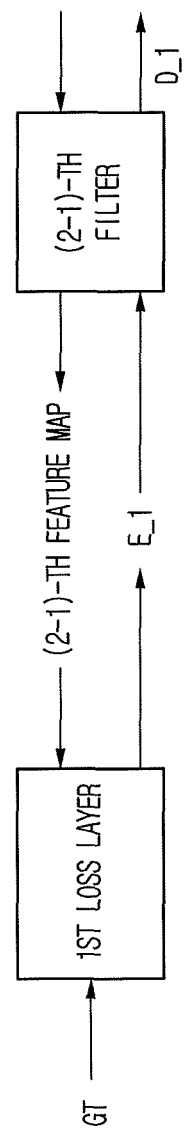
FIG. 3 is a drawing illustrating a process of acquiring a first loss in accordance with one example embodiment of the present invention.

FIG. 3 is a drawing illustrating a process of acquiring the 1-st loss during the backpropagation process in accordance with one example embodiment of the present invention.

The 1-st loss layer generates the 1-st loss by calculating a difference between the GT label image and an estimated label image derived from the (2-1)-th feature map. For a reference, the estimated label image may be acquired by applying predetermined operations (not shown) to the (2-1)-th feature map. In the drawings, however, an assumption is made that the (2-1)-th feature map is the estimated label image, and thus the (2-1)-th feature map is supplied to the 1-st loss layer in FIG. 3.

Generally, various methods for calculating a loss, which is a difference between the GT label image and the estimated label image, may exist. Basically, Euclidian loss layer may be adopted to calculate the loss and the Euclidian loss layer may be described with the following equation:

$$\frac{1}{2N}\sum_{i=1}^{N}\|x_i^1 - x_i^2\|_2^2.$$ (Equation 1)

The equation 1 calculates summation of squares of differences of two inputs.

First, the 1-st loss, indicated as E_1 in FIG. 3, computed by using the equation 1 is supplied to the (2-1)-th filter. The (2-1)-th filter applies the convolution operations to the 1-st loss, i.e., E_1, and produces a 1-st adjusted feature map, hereinafter referred as an 12-th adjusted feature map and indicated as D_1 in FIG. 3.

In detail, the 12-th adjusted feature map, i.e., D_1, may be acquired by the following equation:

$$D\_1 = E\_1 \odot W_{(2\text{-}1)}$$ (Equation 2).

Herein, a symbol □ stands for a convolution operation, D_1 is the 12-th adjusted feature map, E_1 is the 1-st loss, and W(2-1) stands for weights of the (2-1)-th filter.

In case the 12-th adjusted feature map is acquired by applying a convolution filter associated with the 1-st loss layer and disposed between the (2-1)-th filter and the 1-st loss layer, the following equation may be applied:

$$D\_1 = (E\_1 \odot W_{(3\text{-}1)}) \odot W_{(2\text{-}1)}$$ (Equation 3).

Again, W(3-1) stands for weights of the (3-1)-th filter which is a convolution filter associated with the 1-st loss layer. No matter which equation is adopted in generating the D_1, the D_1 is relayed to the (2-2)-th filter.

Herein, as an initial state of the process, the inexistence of an 11-th temporary feature map may be explained by the fact that no previous filter may relay any adjusted feature map to the (2-1)-th filter. Thus, the (2-1)-th filter may receive only the 1-st loss from the 1-st loss layer and apply a convolution operation to the 1-st loss to thereby acquire the 12-th adjusted feature map.

Figure 4:
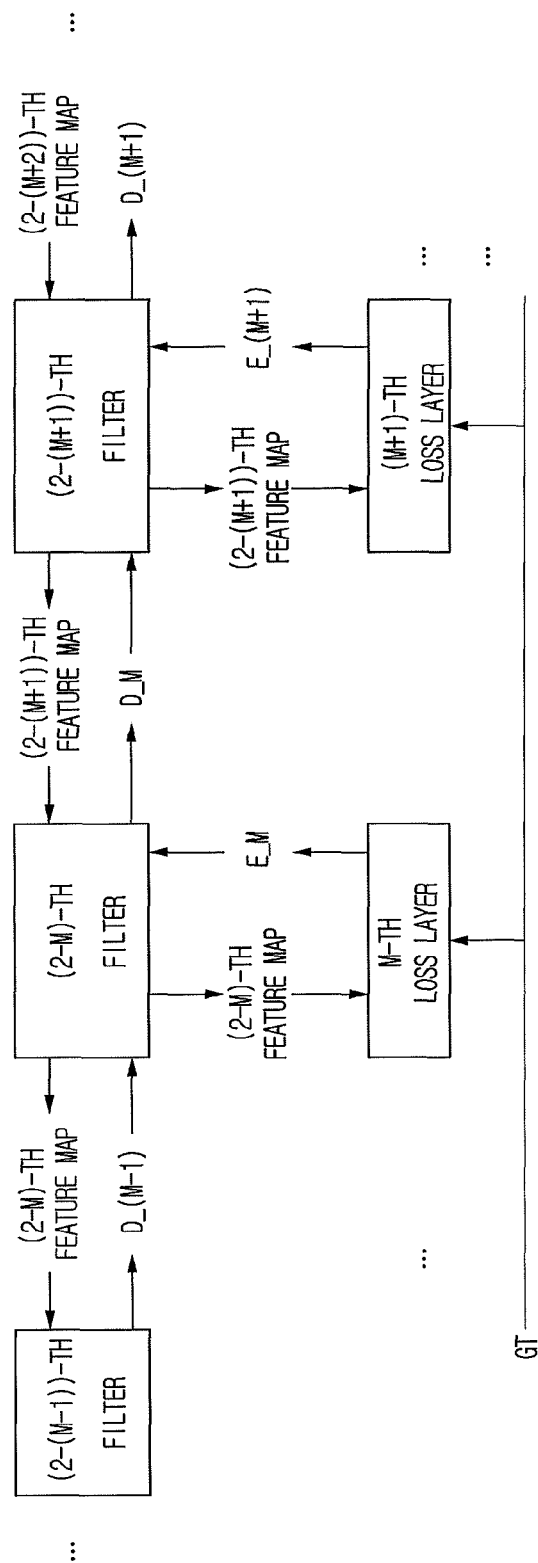
FIG. 4 is a drawing showing a process of acquiring adjusted feature maps in accordance with one example embodiment of the present invention.

FIG. 4 is a drawing showing a process of acquiring adjusted feature maps during the backpropagation process in accordance with one example embodiment of the present invention.

Referring to FIG. 4, the (2-M)-th filter receives from the (2-(M−1))-th filter an (M−1)2-th adjusted feature map during the backpropagation process. And the M-th loss layer computes the M-th loss by identifying a difference between the GT label image and the (2-M)-th feature map. The computed M-th loss may be transferred to the (2-M)-th filter.

As described above, the Euclidian loss layer may be adopted for the computations of the losses, or any one of various known methods for calculating the losses may be used. And as disclosed above, the (2-M)-th filter may receive the M-th loss on which the convolution operations are further performed with a convolution filter associated with the M-th loss layer.

During the backpropagation process, the (2-M)-th filter may receive the (M−1)2-th adjusted feature map, i.e., D_(M−1), from the (2-(M−1))-th filter, and may apply the convolution operation to the (M−1)2-th adjusted feature map by using weight, i.e., parameter, of the (2-M)-th filter and thus the (2-M)-th filter may generate an M1-th temporary feature map, i.e., (D_(M−1)□WM). And the (2-M)-th filter may add the M-th loss to the M1-th temporary feature map to generate an M2-th adjusted feature map, i.e., D_M. Then, the M2-th adjusted feature map may be propagated back to the (2-(M+1))-th filter.

In detail, the M2-th adjusted feature map, i.e., D_M, may be acquired from the (2-M)-th filter by the following equation:

$$D\_M = (D\_(M-1)) \odot W_M + E\_M \, (M \geq 2)$$ (Equation 4)

Herein, a symbol □ stands for a convolution operation, (D_(M−1)□WM) is the M1-th temporary feature map, D_(M−1) and D_M respectively stand for the (M−1)2-th adjusted feature map and the M2-th adjusted feature map, WM stands for weight, i.e., parameter, of the (2-M)-th filter, and E_M represents the M-th loss.

In case the E_M is acquired by performing the convolution operations with filter weights of the convolution filter associated with the M-th loss layer and then E_M is delivered to the (2-M)-th filter, the following equation may be applied for the (2-M)-th filter to acquire the D_M, that is, the $M_2$-th adjusted feature map:

$$D\_M = (D\_(M-1)) \odot W_M + (E\_M) \odot W_{3\text{-}M} \, (M \geq 2)$$ (Equation 5).

Herein, W(3-M) is weight, i.e., parameter, of a convolution filter associated with the M-th loss layer.

Specifically, upon computing a loss between an estimated label image acquired from the (2-M)-th feature map and the GT label image at the M-th loss layer, the loss may not be directly calculated due to distinction of the size and the number of channels between the GT label image and the estimated label image acquired from the (2-M)-th feature map.

Thus, the 1-st to the K-th loss layers may respectively include the (3-1)-th to the (3-K)-th filters (not shown) which are the convolution filters respectively corresponding to the 1-st to the K-th loss layers. Moreover, each of the (3-1)-th to the (3-K)-th filters may adjust the number of channels of each of the (2-1)-th to the (2-K)-th feature maps to the same number of channels as that of the GT label image by respectively performing the convolution operation on each of the (2-1)-th to the (2-K)-th feature maps. In addition, the (3-1)-th to the (3-K)-th filters included in the 1-st to the K-th loss layers may adjust the number of channels of the GT label image to match that with the number of channels of each of the (2-1)-th to the (2-K)-th feature maps. Herein, the filter size of each of the (3-1)-th to the (3-K)-th filters is 1×1, and the (3-1)-th to the (3-K)-th filters may adjust the number of channels of the GT label image or that of each of the (2-1)-th to the (2-K)-th feature maps, but it is not limited thereto.

For a reference, since each of the loss layers interacting with each of the filters included in the decoding layer computes each of the losses, the GT label image may need to be downsized respectively to be corresponding to each of the size of each of the feature maps. That is, the size of the GT label image required at the (2-M)-th loss layer is half of that of the GT label image demanded at the (2-(M−1))-th loss layer due to the size of the (2-M)-th feature map is half of the size of the (2-(M−1))-th feature map.

Figure 5:
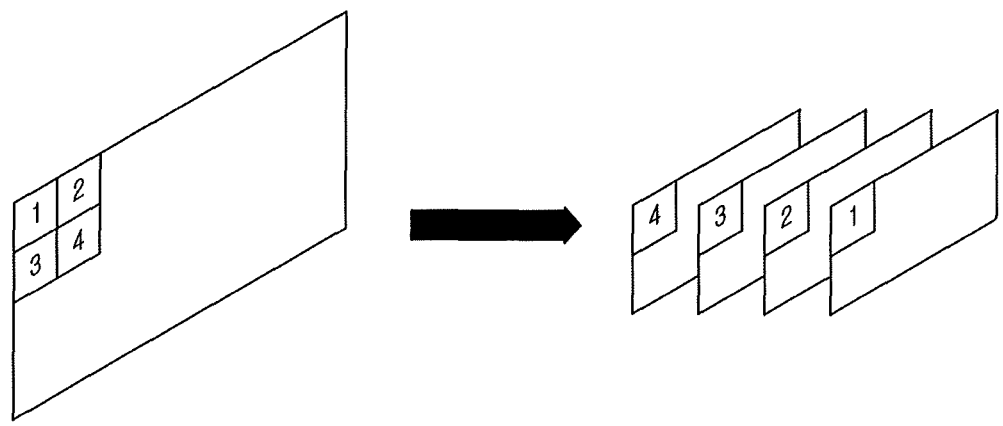
FIG. 5 is a drawing schematically showing a method for changing a size of a Ground Truth (GT) label image by adjusting number of channels of the GT label image.

FIG. 5 is a drawing schematically showing a method for changing the size of the GT label image by adjusting the number of channels of the GT label image.

Another way to decrease the size of the GT label image is to resize it while maintaining the number of channels of original GT label image. In case of resizing the GT label image, nearest neighbor method is adopted since all pixel values of background and foreground, i.e., object(s), of the GT label image are expressed as integers. However, according to the nearest neighbor method, it is inevitable to incur errors during a process of scaling down the size of the GT label image. Such errors will be magnified with filters at the upper layers within which the sizes of the feature maps are gradually enlarged whereas the errors will be diminished with filters at the lower layers within which the sizes of the feature maps are continuously decreased.

To solve the problem described above, as an example shown in FIG. 5, the M-th loss layer matches the size of the GT label image to the size of the (2-M)-th feature map by adjusting the number of channels of the GT label image. Such an approach may be applied to loss layers interacting with the filters at the upper layers, but it is not limited thereto.

For example, as shown in FIG. 5, assuming that the size of the (2-M)-th feature map is 320×240 and that of the GT label image is 640×480, the GT label image with the size of 640×480 may not be directly subtracted from the (2-M)-th feature map with the size of 320×240. Hence, the M-th loss layer increases the number of channels of the GT label image by 4 times through the convolution operations with a filter size of 1×1. Accordingly, the GT label image with the size of 640×480 may be scaled down to one with the size of 320×240 and quadruple number of channels. That is, pixels of the GT label image with the size of 640×480 are shifted to the respective channels to downsize the GT label image, and thus the size of the GT label image is rescaled to 4(ch.)×320×240.

In other words, the M-th loss layer adjusts a GT label image with "a" channels and a size of 640×480 to a GT label image with "4×a" channels and a size of 320×240. And the M-th loss layer adjusts the (2-M)-th feature map with "b" channels and a size of 320×240 to a feature map with "4×a" channels and the size of 320×240 through the (3-M)-th filter whose filter size is 1×1. Then, the M-th loss layer computes a loss between an estimated label image acquired from the above-mentioned feature map and the rescaled GT label image that have the same size of 320×240 and the same number of channels, "4×a".

Figure 6A:
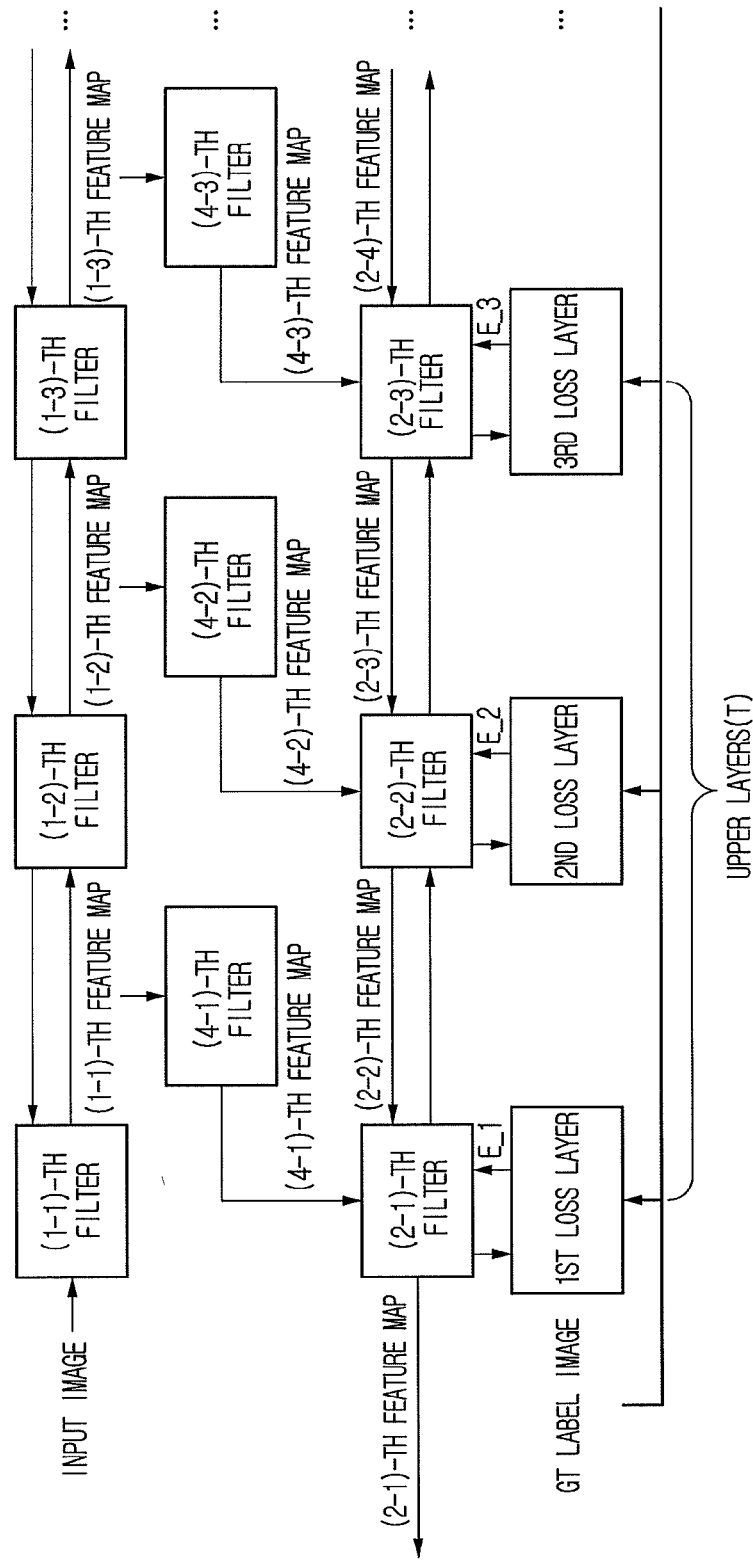
FIGS. 6A and 6B are drawings illustrating a learning process of a learning device including CNN capable of performing image segmentation by using multiple loss layers in accordance with another example embodiment of the present invention.
Figure 6B:
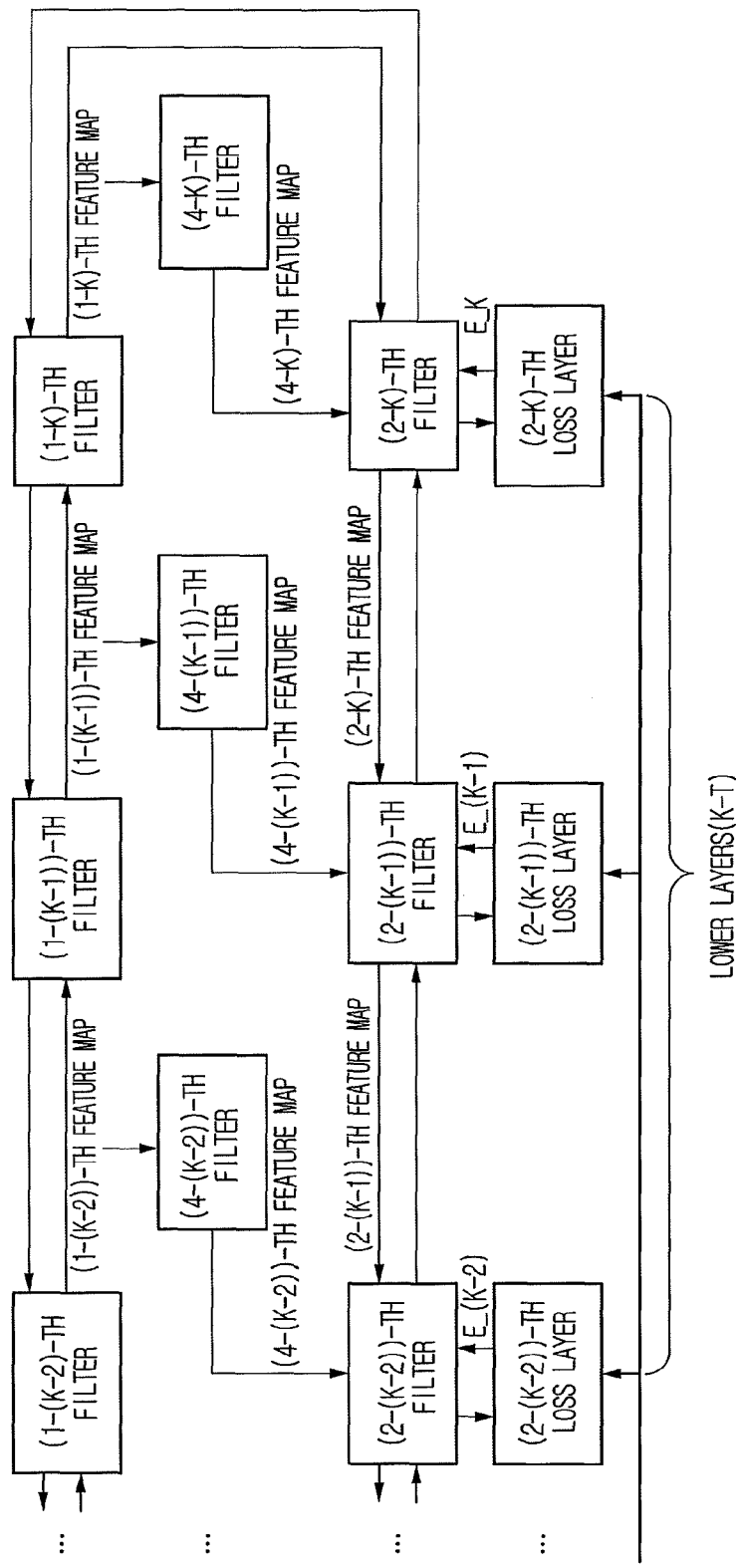

FIGS. 6A and 6B are drawings illustrating a learning process of the CNN capable of performing image segmentation by using the learning device in accordance with another example embodiment of the present invention.

The number of channels of the respective feature maps increases as the size of each of the feature maps decreases. Thus, the filters at the lower part of the decoding layer, i.e., the lower layer filters that deal with feature maps with smaller sizes and larger number of channels, may resize the GT label image instead of adjusting the number of channels thereof through 1×1 convolution operations in order to preclude an issue described below.

Assuming that all the filters included in the decoding layer receive the GT label image with increased number of channels through convolution operations, the losses may be enlarged since a process of producing the numerous number of channels through the convolution operations may exceed filter's capacity. Herein, the convolution operations are performed by the (3-1)-th to the (3-K)-th filters whose filter size is 1×1 as shown in FIG. 5.

Generally, the larger the size of convolution filters or the larger the number of convolution filters, the greater the performance of the convolution operations. For example, the capacity of a 3×3 or 5×5 convolution filter may definitely surpass the capacity of the 1×1 convolution filter. Thus, due to the size of the 1×1 convolution filter, the ability of the 1×1 convolution filter to handle the amount of computations may be limited. Further, the performance of the 1×1 convolution filter may be poor if the amount of computations to be processed increases.

Accordingly, among the 1-st to the K-th loss layers, T upper loss layers, i.e., the 1-st to a T-th loss layers, with larger size of the feature maps respectively adjust the number of channels of the GT label image to reduce the size thereof, whereas K-T lower loss layers, i.e., a (T+1)-th to the K-th loss layers, with smaller size of the feature maps respectively resize the GT label image to reduce the size thereof. That is, the lower loss layers retain the number of channels of the GT label image while resizing the GT label image by using the nearest neighbor method. Further, the number of channels of each of the 2-(T+1)-th to the (2-K)-th feature maps is reduced to the same number of channels as that of the GT label image through the 1×1 convolution operations, and thus making the size and the number of channels of both estimated label images acquired from the respective feature maps at lower layers and their corresponding GT label images equal in order to compute the respective losses. And, the upper loss layers increase the number of channels of the GT label image to reduce the size thereof and thus making the size of both the estimated label images acquired from the respective feature maps at the upper layers and their corresponding GT label images to be identical. Also, the number of channels of each of the (2-1)-th to the (2-T)-th feature maps is adjusted to be the same number of channels as that of the GT label images through the 1×1 convolution operations and then the respective losses are computed. Nevertheless, there is no need for the learning process of the CNN capable of performing image segmentation to differentiate between approaches for acquiring the individual losses of the upper loss layers and that for acquiring the respective losses of the lower loss layers.

As described above, differentiating between approaches for acquiring the individual losses of the upper loss layers and that for acquiring the respective losses of the lower loss layers may greatly contribute to reduce the respective losses, compared to using the same approaches for the respective losses from all the loss layers.

Referring to FIGS. 6A and 6B again, the learning device may further include an intermediate layer having a (4-1)-th to a (4-K)-th filters, i.e., intermediate filters. The intermediate filters may generate a (4-1)-th to a (4-K)-th feature maps by using information on the (1-1)-th to the (1-K)-th feature maps. Each of the (4-1)-th to the (4-K)-th filters may apply dilation convolution operation to each of the (1-1)-th to the (1-K)-th feature maps to thereby respectively produce the (4-1)-th to the (4-K)-th feature maps, and then may relay each of the (4-1)-th to the (4-K)-th feature maps to each of the (2-1)-th to the (2-K)-th filters. Then, the (2-1)-th to the (2-K)-th filters may produce the (2-1)-th to the (2-K)-th feature maps by further using the (4-1)-th to the (4-K)-th feature maps.

The intermediate filters, i.e., the (4-1)-th to the (4-K)-th filters, may extract information on edges in each of the (1-1)-th to the (1-K)-th feature maps through one or more dilation convolution operations whose receptive field is increased. As a result, the (2-1)-th to the (2-K)-th filters may utilize the extracted information on the edges of the encoded feature maps and more of such information may be handed over to next filters in the decoding layer, while performing the decoding process.

In addition, the learning device may allow at least part of the (2-1)-th to the (2-K)-th filters to generate feature maps by using at least part of the (4-1)-th to the (4-K)-th feature maps. That is, dilation convolution operations may be selectively applied to the (1-1)-th to the (1-K)-th feature maps to obtain their corresponding the (4-1)-th to the (4-K)-th feature maps.

Herein, the intermediate filters perform the dilation convolution operations, but it is not limited thereto. For example, at least part of the intermediate filters may perform convolution operations, as the case may be. Meanwhile, the feature maps generated by the intermediate filters may be directly or indirectly referred by the filters included in the decoding layer.

Figure 7A:
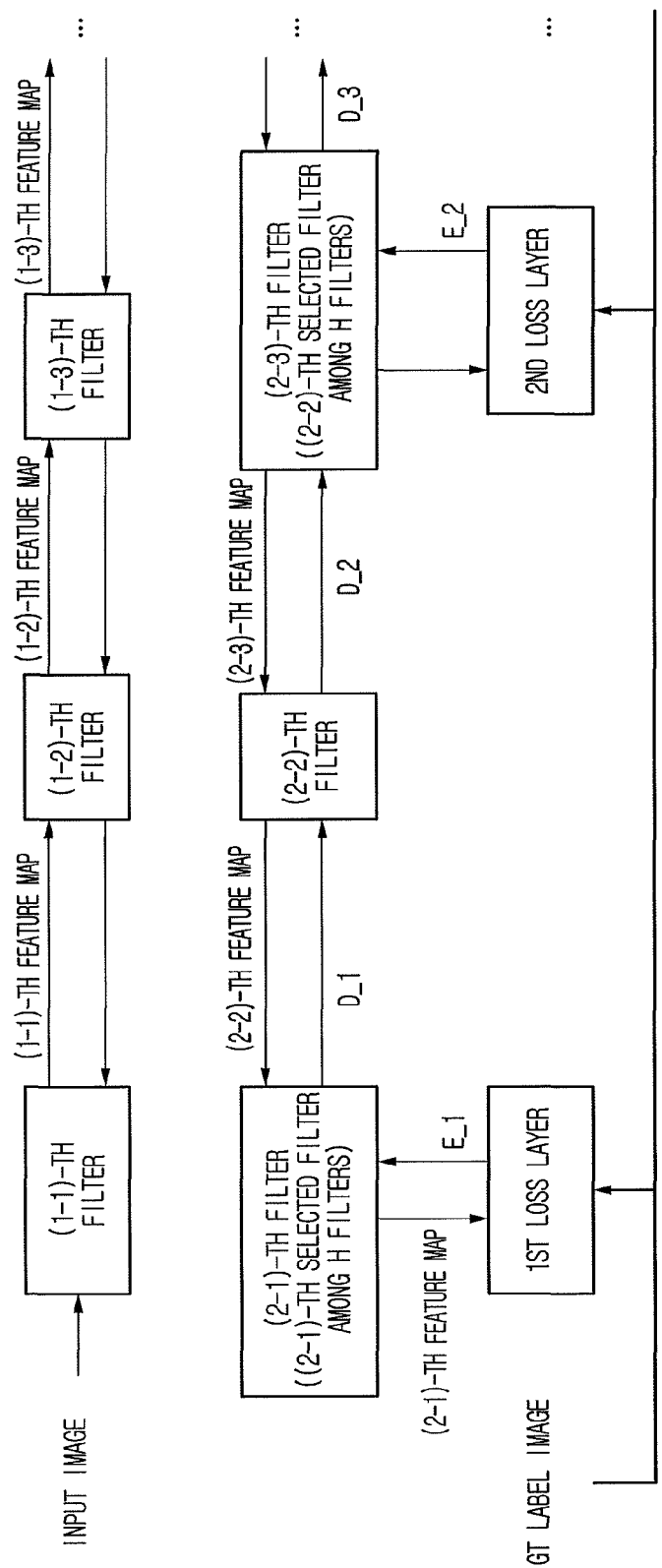
FIGS. 7A and 7B are drawings illustrating a learning process of a learning device including CNN capable of performing image segmentation by using multiple loss layers in accordance with still another example embodiment of the present invention.
Figure 7B:
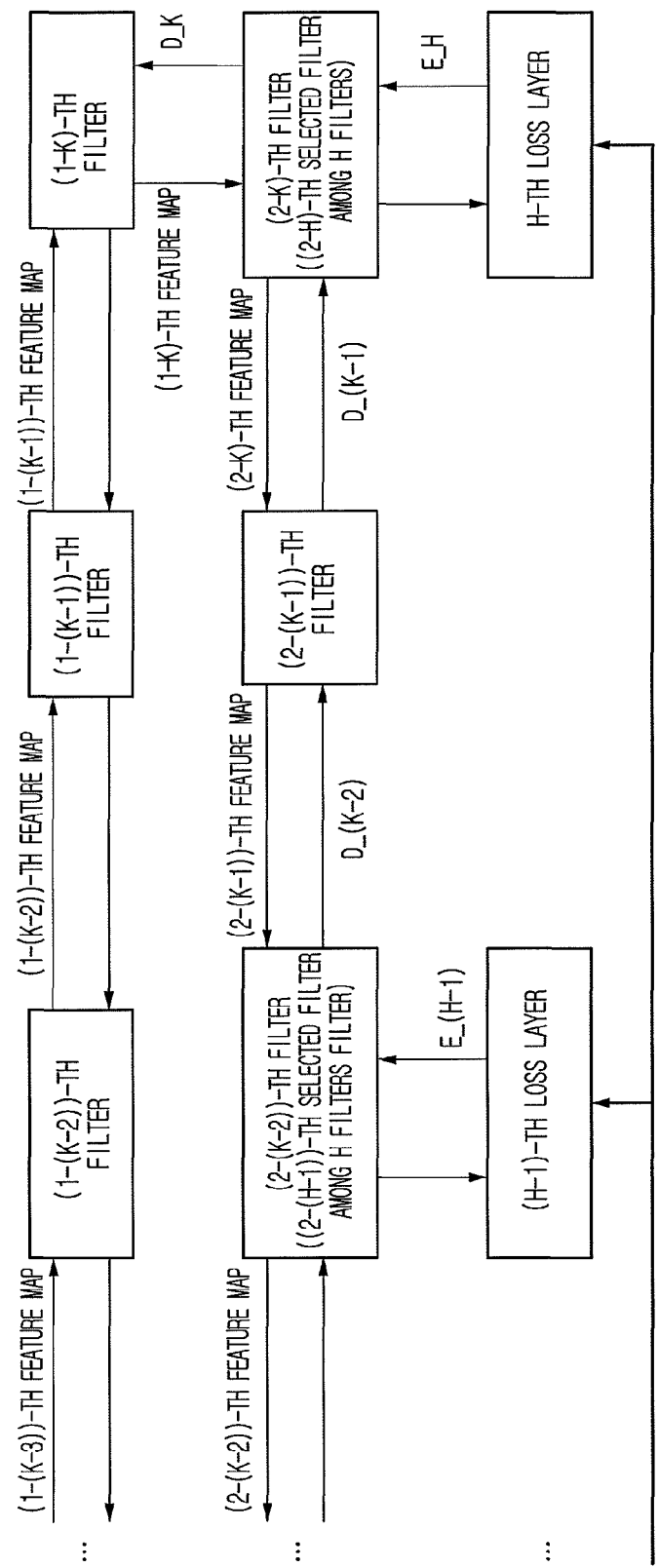

FIGS. 7A and 7B are drawings illustrating a learning process of the CNN capable of performing image segmentation in accordance with still another example embodiment of the present invention. The learning process illustrated in FIGS. 7A and 7B is similar to the learning process illustrated in FIGS. 2A and 2B except for that loss layers do not interact with a part of the filters included in the decoding layer. That is, the loss layers may be associated with a part of the filters included in the decoding layer.

Referring to FIGS. 7A and 7B, H filters, i.e., a (2-1)-th to a (2-H)-th selected filters, selected among the (2-1)-th to the (2-K)-th filters in the decoding layer, may interact with a 1-st to an H-th loss layers. Herein, the (2-1)-th to the (2-H)-th selected filters are numerated from an upper side of the decoding layer to a lower side thereof.

Comparing to the K filters, i.e. the (2-1)-th to the (2-K)-th filters, the like reference numerals may not refer to the like parts. For instance, the (2-2)-th selected filter among the H filters may refer to a different one from the (2-2)-th filter among the K filters. For a reference, H is a positive integer which is greater than zero and less than K. The H filters are marked in parentheses as shown in FIGS. 7A and 7B.

In FIGS. 7A and 7B, the learning device may include the 1-st to the H-th loss layers respectively interacting with the (2-1)-th to the (2-H)-th selected filters included in the decoding layer. Besides, the learning device may perform a process of respectively computing the 1-st to the H-th losses from the 1-st to the H-th loss layers, where the respective H losses correspond to each of H feature maps acquired from the H filters in the decoding layer.

In case the loss layers are not connected to all the filters in the decoding layer but connected to the part thereof, the number of loss layers and the amount of computations are reduced. Further, the efficiency of the learning process may be maintained even with the decreased number of loss layers since the adjusted feature maps may be still generated by using the loss layers connected to the part of the filters in the decoding layer during the backpropagation process.

Particularly, it is desirable that (i) the (2-K)-th filter related to the (1-K)-th feature map which contains the most influential and significant information and (ii) the (2-1)-th filter capable of producing the label image be interacted with their corresponding loss layers.

Hence, it is reaffirmed that adopting the multi-loss layers as disclosed in the present invention may eliminate lots of noises within the feature maps. Comparing to the conventional technology in which a single final loss layer is connected to the last filter in the decoding layer, the performance of image segmentation may be greatly improved in accordance with the present invention.

FIGS. 2A and 2B to FIGS. 7A and 7B illustrate the learning device and the learning method using the same in accordance with the present invention. For a reference, the learning device may find the optimal parameters by performing the backpropagation process while a testing device for performing image segmentation may not execute this process.

Herein, the configuration and corresponding functions of the testing device (not shown) for performing image segmentation will be briefly described. The testing device utilizes the parameters found through the learning process mentioned above and performs image segmentation on test images. The testing device may be the same device as the learning device aforementioned or it may be a different one.

A testing device (not shown) for performing image segmentation on a test image as an input image includes a communication part (not shown) and a processor (not shown). The communication part may be configured to communicate with external devices.

Particularly, the communication part may be configured to acquire the test image, on the conditions that (I) the learning device includes (i) an encoding layer having each of a (1-1)-th to a (1-K)-th filters respectively generating a (1-1)-th to a (1-K)-th feature maps by applying one or more convolution operations to a training image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, (II) the learning device, if a training image is obtained, acquires the (2-K)-th to the (2-1)-th feature maps through the encoding layer and the decoding layer, and acquires a 1-st to an H-th losses from the 1-st to the H-th loss layers respectively corresponding to each of H feature maps, obtained from the H filters, among the (2-K)-th to the (2-1)-th feature maps; (III) the learning device, upon performing a backpropagation process, performs processes of (1) allowing the (2-M)-th filter to apply a convolution operation to an (M−1)2-th adjusted feature map relayed from the (2-(M−1))-th filter to thereby obtain an M1-th temporary feature map; and (2) relaying, to the (2-(M+1))-th filter, M2-th adjusted feature map obtained by computing the M-th loss with the M1-th th temporary feature map; and (3) adjusting at least part of parameters of the (1-1)-th to the (1-K)-th filters and the (2-K)-th to the (2-1)-th filters, where M is an integer greater than or equal to 2 and less than or equal to K−1, wherein, as an initial state of (III), the 1-st loss layer computes the 1-st loss corresponding to the (2-1)-th feature map, and the (2-1)-th filter applies a convolution operation to the 1-st loss to thereby acquire an l2-th adjusted feature map, and the (2-1)-th filter relays the l2-th adjusted feature map to the (2-2)-th filter; and (IV) the learning device acquires adjusted parameters of the (2-K)-th to the (2-1)-th filters and the (1-1)-th to the (1-K)-th filters.

Moreover, the processor may be configured to perform image segmentation on the acquired test image by using the adjusted parameters of at least part of the filters in the decoding layer and the encoding layer, i.e., the (2-K)-th to the (2-1)-th filters and the (1-1)-th to the (1-K)-th filters.

The present invention has an effect of correcting losses of respective filters in a decoding layer obtained from respective separate loss layers by connecting each of the filters in the decoding layer with each of the loss layers that calculates a loss.

Also, the present invention has another effect of reflecting correct losses by preventing losses from diminishing while the losses are propagated back to each filter during a backpropagation process.

In addition, the present invention has another effect of providing a learning environment within which optimal parameters of each filter are found by reflecting the correct losses on each filter during the backpropagation process.

Besides, the present invention has still another effect of providing a test environment for images within which image segmentations are performed accurately by finding the optimal parameters for each filter.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A learning method for improving image segmentation by using a learning device, wherein the learning device includes (i) an encoding layer having each of a (1-1)-th to a (1-K)-th filters respectively generating a (1-1)-th to a (1-K)-th feature maps by applying one or more convolution operations to a training image as an input image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, comprising steps of:
   (a) the learning device, if the input image is obtained, acquiring or supporting another device to acquire the (2-K)-th to the (2-1)-th feature maps through the encoding layer and the decoding layer, and acquiring or supporting another device to acquire a 1-st to an H-th losses from the 1-st to the H-th loss layers respectively corresponding to each of H feature maps, obtained from the H selected filters, among the (2-K)-th to the (2-1)-th feature maps; and
   (b) the learning device, upon performing a backpropagation process, performing processes of (1) allowing the (2-M)-th filter to apply a convolution operation to an $(M-1)_2$-th adjusted feature map relayed from the (2-(M-1))-th filter to thereby obtain an $M_1$-th temporary feature map; and (2) relaying, to the (2-(M+1))-th filter, $M_2$-th adjusted feature map obtained by computing the M-th loss with the $M_1$-th temporary feature map and (3) adjusting at least part of parameters of the (1-1)-th to the (1-K)-th filters and the (2-K)-th to the (2-1)-th filters, where M is an integer greater than or equal to 2 and less than or equal to K−1,
   wherein, as an initial state of the step (b), the 1-st loss layer computes the 1-st loss corresponding to the (2-1)-th feature map, and the (2-1)-th filter applies a convolution operation to the 1-st loss to thereby acquire an $l_2$-th adjusted feature map, and the (2-1)-th filter relays the $l_2$-th adjusted feature map to the (2-2)-th filter.

2. The method of claim 1, wherein the 1-st to the H-th loss layers respectively compute the 1-st to the H-th losses by respectively comparing a 1-st to an H-th ground truth (GT) label images with a (3-1)-th to a (3-H)-th feature maps generated by each of a (3-1)-th to a (3-H)-th filters applying one or more convolution operations to each of the H feature maps.

3. The method of claim 2, wherein a size of each of the (3-1)-th to the (3-H)-th filters is 1×1, and number of channels of each of the (3-1)-th to the (3-H)-th feature maps is controlled to be equal to that of each of the 1-st to the H-th GT label images by applying one or more convolution operations to each of the H feature maps, and wherein a size of each of the 1-st to the H-th GT label images are controlled to be corresponding to that of each of the (3-1)-th to the (3-H)-th feature maps.

4. The method of claim 3, wherein at least part of the 1-st to the H-th GT label images are acquired by respectively adjusting a number of channels of an original ground truth (GT) label image and by respectively changing a size of the original GT label image in order to match the size of the original GT label image with that of each of the H feature maps.

5. The method of claim 4, wherein the number of channels of the original GT label image is adjusted by increasing the number of channels of the original GT label image and reducing the size of the original GT label image by each ratio of (i) the size of the original GT label image and (ii) that of each of the H feature maps.

6. The method of claim 4, wherein at least part of the 1-st to the H-th GT label images are obtained by respectively resizing the original GT label image in order to match the size of the original GT label image with each of the sizes of the H feature maps.

7. The method of claim 4, wherein, if t is an integer greater than or equal to 1 and less than H, the learning device allows the 1-st to a t-th loss layers among the H loss layers to respectively change the size of the original GT label image by respectively adjusting the number of channels of the original GT label image whereas the learning device allows a (t+1)-th to the H-th loss layers to respectively change the size of the original GT label image by respectively resizing the original GT label image, and wherein, if t is an integer equal to H, the learning device allows the 1-st to the H-th loss layers to respectively change the size of the original GT label image by respectively adjusting the number of channels of the original GT label image.

8. The method of claim 7, wherein the original GT label image is respectively resized while maintaining the number of channels of the original GT label image.

9. The method of claim 1, wherein the learning device allows at least part of the (1-1)-th to the (1-K)-th feature maps respectively corresponding to each of intermediate filters included in an intermediate layer between the encoding layer and the decoding layer to be inputted into each of the intermediate filters, and wherein the learning device allows at least part of the (2-1)-th to the (2-K)-th filters to obtain at least part of the (2-1)-th to the (2-K)-th feature maps by further using specific feature maps acquired from one or more intermediate filters.

10. The method of claim 9, wherein, if the intermediate filters including a (4-1)-th to a (4-K)-th filters perform one or more Dilation convolution operations, the learning device performs a process of obtaining a (4-1)-th to a (4-K)-th feature maps by applying the Dilation convolution operations to each of the (1-1)-th to the (1-K)-th feature maps with the (4-1)-th to the (4-K)-th filters, and a process of respectively relaying the (4-1)-th to the (4-K)-th feature maps to the (2-1)-th to the (2-K)-th filters.

11. A testing method for performing image segmentation on a test image as an input image, comprising steps of:
 (a) a testing device acquiring or supporting another device to acquire the test image, on conditions that (I) a learning device includes (i) an encoding layer having each of a (1-1)-th to a (1-K)-th filters respectively generating a (1-1)-th to a (1-K)-th feature maps by applying one or more convolution operations to a training image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, (II) the learning device, if a training image is obtained, acquires the (2-K)-th to the (2-1)-th feature maps through the encoding layer and the decoding layer, and acquires a 1-st to an H-th losses from the 1-st to the H-th loss layers respectively corresponding to each of H feature maps, obtained from the H filters, among the (2-K)-th to the (2-1)-th feature maps; (III) the learning device, upon performing a backpropagation process, performs processes of (1) allowing the (2-M)-th filter to apply a convolution operation to an (M−1)$_2$-th adjusted feature map relayed from the (2-(M−1))-th filter to thereby obtain an M$_1$-th temporary feature map; and (2) relaying, to the (2-(M+1))-th filter, M$_2$-th adjusted feature map obtained by computing the M-th loss with the M$_1$-th temporary feature map; and (3) adjusting at least part of parameters of the (1-1)-th to the (1-K)-th filters and the (2-K)-th to the (2-1)-th filters, where M is an integer greater than or equal to 2 and less than or equal to K−1, wherein, as an initial state of (III), the 1-st loss layer computes the 1-st loss corresponding to the (2-1)-th feature map, and the (2-1)-th filter applies a convolution operation to the 1-st loss to thereby acquire an l$_2$-th adjusted feature map, and the (2-1)-th filter relays the l$_2$-th adjusted feature map to the (2-2)-th filter; and (IV) the learning device acquires adjusted parameters of the (2-K)-th to the (2-1)-th filters and the (1-1)-th to the (1-K)-th filters; and
 (b) the testing device performing image segmentation or supporting another device to perform image segmentation on the acquired test image by utilizing the adjusted parameters of the (2-k)-th to the (2-1)-th filters and the (1-1)-th to the (1-K)-th filters.

12. The method of claim 11, wherein the learning device allows at least part of the (1-1)-th to the (1-K)-th feature maps respectively corresponding to each of intermediate filters included in an intermediate layer between the encoding layer and the decoding layer to be inputted into each of the intermediate filters, and wherein the testing device allows at least part of the (2-1)-th to the (2-K)-th filters to obtain at least part of the (2-1)-th to the (2-K)-th feature maps by further using specific feature maps acquired from one or more intermediate filters.

13. The method of claim 12, wherein, if the intermediate filters including a (4-1)-th to a (4-K)-th filters perform one or more Dilation convolution operations, the testing device performs a process of obtaining a (4-1)-th to a (4-K)-th feature maps by applying the Dilation convolution operations to each of the (1-1)-th to the (1-K)-th feature maps with the (4-1)-th to the (4-K)-th filters, and a process of respectively relaying the (4-1)-th to the (4-K)-th feature maps to the (2-1)-th to the (2-K)-th filters.

14. A learning device for improving image segmentation, wherein the learning device includes (i) an encoding layer having each of a (1-1)-th to a (1-K)-th filters respectively generating a (1-1)-th to a (1-K)-th feature maps by applying one or more convolution operations to a training image as an input image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, comprising:
 a communication part for receiving the input image;
 a processor for performing processes of (I) acquiring or supporting another device to acquire, if the input image is obtained, the (2-K)-th to the (2-1)-th feature maps through the encoding layer and the decoding layer, and acquiring or supporting another device to acquire a 1-st to a H-th losses from the 1-st to the H-th loss layers respectively corresponding to each of H feature maps, obtained from the H filters, among the (2-K)-th to the (2-1)-th feature maps; and of (II) upon performing a backpropagation process, (i) allowing the (2-M)-th filter to apply a convolution operation to an (M−1)$_2$-th adjusted feature map relayed from the (2-(M−1))-th filter to thereby obtain an M$_1$-th temporary feature map; (ii) relaying, to the (2-(M+1))-th filter, M$_2$-th adjusted feature map obtained by computing the M-th loss with the M$_1$-th temporary feature map; and (iii) adjusting at least part of parameters of the (1-1)-th to the (1-K)-th filters and the (2-K)-th to the (2-1)-th filters,
 wherein M is an integer greater than or equal to 2 and less than or equal to K−1 and wherein, as an initial state, the 1-st loss layer computes the 1-st loss corresponding to the (2-1)-th feature map, and the (2-1)-th filter applies a convolution operation to the 1-st loss to thereby acquire an l$_2$ adjusted feature map, and the (2-1)-th filter relays the l$_2$ adjusted feature map to the (2-2)-th filter.

15. The learning device of claim 14, wherein the processor is configured to allow the 1-st to the H-th loss layers to respectively compute the 1-st to the H-th losses by respectively comparing a 1-st to an H-th ground truth (GT) label images with a (3-1)-th to a (3-H)-th feature maps generated by each of a (3-1)-th to a (3-H)-th filters applying one or more convolution operations to each of the H feature maps.

16. The learning device of claim 15, wherein a size of each of the (3-1)-th to the (3-H)-th filters is 1×1, and number of channels of each of the (3-1)-th to the (3-H)-th feature maps are configured to be equal to that of each of the 1-st to the H-th GT label images by applying one or more convolution operations to each of the H feature maps, and wherein a size of each of the 1-st to the H-th GT label images are configured to be corresponding to that of each of the (3-1)-th to the (3-H)-th feature maps.

17. The learning device of claim 16, wherein the processor is configured to acquire at least part of the 1-st to the H-th GT label images by respectively adjusting a number of channels of an original ground truth (GT) label image and by respectively changing a size of the original GT label image in order to match the size of the original GT label image with that of each of the H feature maps.

18. The learning device of claim 17, wherein the processor is configured to adjust the number of channels of the original GT label image by increasing the number of channels of the original GT label image and reducing the size of the original GT label image by each ratio of (i) the size of the original GT label image and (ii) that of each of the H feature maps.

19. The learning device of claim 17, wherein the processor is configured to obtain at least part of the 1-st to the H-th GT label images by respectively resizing the original GT label image in order to match the size of the original GT label image with each of the sizes of the H feature maps.

20. The learning device of claim 17, wherein, if t is an integer greater than or equal to 1 and less than H, the processor is configured to allow the 1-st to a t-th loss layers among the H loss layers to respectively change the size of the original GT label image by respectively adjusting the number of channels of the original GT label image whereas the processor is configured to allow a (t+1)-th to the H-th loss layers to respectively change the size of the original GT label image by respectively resizing the original GT label image, and wherein, if t is an integer equal to H, the processor is configured to allow the 1-st to the H-th loss layers to respectively change the size of the original GT label image by respectively adjusting the number of channels of the original GT label image.

21. The learning device of claim 20, wherein the processor is configured to respectively resize the original GT label image while maintaining the number of channels of the original GT label image.

22. The learning device of claim 14, wherein the processor is configured to allow at least part of the (1-1)-th to the (1-K)-th feature maps respectively corresponding to each of intermediate filters included in an intermediate layer between the encoding layer and the decoding layer to be inputted into each of the intermediate filters, and at least part of the (2-1)-th to the (2-K)-th filters to obtain at least part of the (2-1)-th to the (2-K)-th feature maps by further using specific feature maps acquired from one or more intermediate filters.

23. The learning device of claim 22, wherein, if the intermediate filters including a (4-1)-th to a (4-K)-th filters perform one or more dilation convolution operations, the processor is configured to perform a process of obtaining a (4-1)-th to a (4-K)-th feature maps by applying the dilation convolution operations to each of the (1-1)-th to the (1-K)-th feature maps with the (4-1)-th to the (4-K)-th filters, and to perform a process of respectively relaying the (4-1)-th to the (4-K)-th feature maps to the (2-1)-th to the (2-K)-th filters.

24. A testing device for performing image segmentation on a test image as an input image, comprising:

a communication part for acquiring or supporting another device to acquire the test image, on conditions that (I) a learning device includes (i) an encoding layer having each of a (1-1)-th to a (1-K)-th filters respectively generating a (1-1)-th to a (1-K)-th feature maps by applying one or more convolution operations to a training image; (ii) a decoding layer having each of a (2-K)-th to a (2-1)-th filters respectively generating a (2-K)-th to a (2-1)-th feature maps by applying one or more deconvolution operations to the 1-K feature map; and (iii) a 1-st to an H-th loss layers respectively interacting with H filters among the K filters included in the decoding layer, (II) the learning device, if a training image is obtained, acquires the (2-K)-th to the (2-1)-th feature maps through the encoding layer and the decoding layer, and acquires a 1-st to an H-th losses from the 1-st to the H-th loss layers respectively corresponding to each of H feature maps, obtained from the H filters, among the (2-K)-th to the (2-1)-th feature maps; (III) the learning device, upon performing a backpropagation process, performs processes of (1) allowing the (2-M)-th filter to apply a convolution operation to an $(M-1)_2$-th adjusted feature map relayed from the (2-(M−1))-th filter to thereby obtain an $M_1$-th temporary feature map; and (2) relaying, to the (2-(M+1))-th filter, $M_2$-th adjusted feature map obtained by computing the M-th loss with the $M_1$-th temporary feature map; and (3) adjusting at least part of parameters of the (1-1)-th to the (1-K)-th filters and the (2-K)-th to the (2-1)-th filters, where M is an integer greater than or equal to 2 and less than or equal to K−1, wherein, as an initial state of (III), the 1-st loss layer computes the 1-st loss corresponding to the (2-1)-th feature map, and the (2-1)-th filter applies a convolution operation to the 1-st loss to thereby acquire an $l_2$-th adjusted feature map, and the (2-1)-th filter relays the $l_2$-th adjusted feature map to the (2-2)-th filter; and (IV) the learning device acquires adjusted parameters of the (2-K)-th to the (2-1)-th filters and the (1-1)-th to the (1-K)-th filters; and a processor for performing image segmentation or supporting another device to perform image segmentation on the acquired test image by utilizing the adjusted parameters of the (2-k)-th to the (2-1)-th filters and the (1-1)-th to the (1-K)-th filters.

25. The testing device of claim 24, wherein the processor is configured to allow at least part of the (2-1)-th to the (2-K)-th filters to obtain at least part of the (2-1)-th to the (2-K)-th feature maps by further using specific feature maps acquired from intermediate filters included in an intermediate layer between the encoding layer and the decoding layer, and to select inputs among the (1-1)-th to the (1-K)-th feature maps for the intermediate filters.

26. The testing device of claim 25, wherein, if the intermediate filters including a (4-1)-th to a (4-K)-th filters perform one or more dilation convolution operations, the processor is configured to perform a process of obtaining a (4-1)-th to a (4-K)-th feature maps by applying the dilation convolution operations to each of the (1-1)-th to the (1-K)-th feature maps with the (4-1)-th to the (4-K)-th filters, and to perform a process of respectively relaying the (4-1)-th to the (4-K)-th feature maps to the (2-1)-th to the (2-K)-th filters.

* * * * *